(12) United States Patent
Keshet

(10) Patent No.: US 10,305,578 B2
(45) Date of Patent: May 28, 2019

(54) METHOD OF EXCHANGING COMMUNICATIONS BETWEEN A SATELLITE AND TERMINALS ASSOCIATED THEREWITH

(71) Applicant: Satixfy Israel Ltd., Rehovot (IL)

(72) Inventor: Arie Keshet, Ramat Efal (IL)

(73) Assignee: SATIXFY ISRAEL LTD., Rehovot (IL)

( * ) Notice: Subject to any disclaimer, the term of this patent is extended or adjusted under 35 U.S.C. 154(b) by 158 days.

(21) Appl. No.: 15/310,886

(22) PCT Filed: May 13, 2015

(86) PCT No.: PCT/IL2015/000023
§ 371 (c)(1),
(2) Date: Nov. 14, 2016

(87) PCT Pub. No.: WO2015/173793
PCT Pub. Date: Nov. 19, 2015

(65) Prior Publication Data
US 2017/0093482 A1    Mar. 30, 2017

Related U.S. Application Data

(60) Provisional application No. 61/992,948, filed on May 14, 2014.

(51) Int. Cl.
*H04B 7/185* (2006.01)
*H04B 7/212* (2006.01)
(Continued)

(52) U.S. Cl.
CPC ..... *H04B 7/18513* (2013.01); *H04B 7/18519* (2013.01); *H04B 7/18521* (2013.01);
(Continued)

(58) Field of Classification Search
CPC ... H04B 7/1851–7/18532; H04B 7/212; H04L 5/14
See application file for complete search history.

(56) References Cited

U.S. PATENT DOCUMENTS

| | | |
|---|---|---|
| 5,481,561 A | 1/1996 | Fang |
| 5,663,734 A | 9/1997 | Krasner |

(Continued)

FOREIGN PATENT DOCUMENTS

| | | |
|---|---|---|
| CN | 1799208 A | 7/2006 |
| CN | 101043481 | 9/2007 |

(Continued)

OTHER PUBLICATIONS

Fernandez et al., A heuristic Algorithm for the Resource Assignment Problem in Satellite Telecommunication Networks, 20th RCRA International Workshop Conference Proceeding, pp. 1-14 (2013).

(Continued)

*Primary Examiner* — Paul H Masur
(74) *Attorney, Agent, or Firm* — Browdy and Neimark, PLLC

(57) ABSTRACT

A method is provided for enabling communications between one or more satellites and a plurality of terminals wherein the plurality of terminals are divided into M groups of terminals and wherein the method comprising: forwarding a plurality of communication frames in a forward link, wherein said plurality of frames are divided into N sub-frames, and wherein traffic being carried along the forward link by each of the N sub-frames serves one or more groups of terminals associated with a respective satellite, and assigning, by a satellite return link scheduler, a respective capacity of the return link for at least one of the one or more groups of terminals, wherein the assignment takes into (Continued)

account which of the sub-frames is associated with that at least one group of the terminals.

18 Claims, 1 Drawing Sheet

(51) Int. Cl.
*H04L 5/14* (2006.01)
*H04W 84/06* (2009.01)
*H04W 88/16* (2009.01)

(52) U.S. Cl.
CPC ............... *H04B 7/212* (2013.01); *H04L 5/14* (2013.01); *H04W 84/06* (2013.01); *H04W 88/16* (2013.01)

(56) References Cited

U.S. PATENT DOCUMENTS

| | | |
|---|---|---|
| 6,463,040 B1 | 10/2002 | Dutta |
| 6,504,855 B1 | 1/2003 | Matsunaga |
| 7,035,311 B2 | 4/2006 | Nohara et al. |
| 8,010,043 B2 | 8/2011 | Miller |
| 9,143,271 B2 | 9/2015 | Hong et al. |
| 9,461,701 B1 | 10/2016 | Mitchener |
| 9,735,940 B1 | 8/2017 | Bakr et al. |
| 2002/0054632 A1 | 5/2002 | Chuang et al. |
| 2003/0086512 A1 | 5/2003 | Rick et al. |
| 2004/0101046 A1 | 5/2004 | Yang et al. |
| 2004/0114547 A1 | 6/2004 | Christodoulides et al. |
| 2006/0176984 A1 | 8/2006 | Lee et al. |
| 2007/0085736 A1 | 4/2007 | Ray et al. |
| 2007/0126612 A1 | 6/2007 | Miller |
| 2007/0248076 A1 | 10/2007 | Ji et al. |
| 2009/0023384 A1 | 1/2009 | Miller |
| 2009/0285151 A1 | 11/2009 | Eidenschink et al. |
| 2010/0128660 A1 | 5/2010 | Becker et al. |
| 2011/0032920 A1 | 2/2011 | Suberviola |
| 2011/0268017 A1 | 11/2011 | Miller |
| 2012/0207144 A1 | 8/2012 | Bouvet et al. |
| 2013/0177061 A1 | 7/2013 | Ram et al. |
| 2013/0331026 A1 | 12/2013 | O'Neill et al. |
| 2014/0226682 A1* | 8/2014 | Becker ............... H04B 7/18523 370/474 |
| 2014/0369450 A1 | 12/2014 | Leyh et al. |
| 2016/0182189 A1 | 6/2016 | Stadali et al. |
| 2017/0104520 A1 | 4/2017 | Rainish |

FOREIGN PATENT DOCUMENTS

| | | |
|---|---|---|
| CN | 101573891 A | 11/2009 |
| CN | 101908920 A | 12/2010 |
| CN | 102461195 | 5/2012 |
| CN | 103701740 A | 4/2014 |
| WO | 2008100341 A2 | 8/2008 |
| WO | 2011027688 A1 | 3/2011 |
| WO | 2012038380 A1 | 3/2012 |
| WO | 2015/177779 A1 | 11/2015 |

OTHER PUBLICATIONS

Noussi et al., Broadband Satellite Links over Rain-Affected Wide Areas, University of Portsmouth, pp. 1-5 (2004).
ITU-R Recommendation No. P.618 entitled Propagation data and prediction methods required for the design of Earth-space telecommunication systems, pp. 1-26 (2013).
International Search Report dated Feb. 14, 2018 of corresponding PCT application PCT/IL2017/051247.

* cited by examiner

METHOD OF EXCHANGING COMMUNICATIONS BETWEEN A SATELLITE AND TERMINALS ASSOCIATED THEREWITH

FIELD OF THE DISCLOSURE

The present disclosure generally relates to the field of communications and more particularly, to methods for carrying out communications in a satellite communications network.

BACKGROUND OF THE DISCLOSURE

The present disclosure relates to a satellite system where Frequency Division Duplexing (FDD) is used. Different frequencies are used for the forward traffic (i.e. traffic transmitted from the satellite to the terminals) and for the return traffic (i.e. traffic transmitted from terminals to the satellite) of the RF link, and the system is characterized in that terminals cannot receive traffic while they are transmitting traffic. In order to accommodate this limitation, and at the same time make efficient use of both uplink and downlink capacity, the system must perform specialized forward link multiplexing and return link capacity assignment.

The term "satellite system(s)" referred to hereinbelow, should be understood to encompass any one or more members of the group that consists of geo-stationary satellite systems, Low Earth Orbit ("LEO") satellite systems and Medium Earth Orbit ("MEO") satellite systems and other types of platforms such as High-Altitude Platforms ("HAP") which are quasi-stationary aircrafts that provide means of delivering a service to a large area while remaining in the air for long periods of time, High-altitude, long-endurance unmanned aerial vehicles ("HALE UAV"), and the like.

In a typical satellite communications network a portion of the available capacity is allocated for hub-to-satellite communications in the forward link. Similarly, a portion of the return link capacity is allocated for satellite-to-hub communications. Although these portions of the link capacity, allocated for communicating with the hub, (also referred to as an earth station, gateway or teleport), are not discussed explicitly in the following description, still, it should be noted that the methods and air interface protocols discussed in the following disclosure may as well, and typically are, implemented in such a hub, in case where the satellite serves merely as a "bent pipe". Namely, the satellite does not process the signals it receives other than carrying out a basic filtering thereon and shifting them in frequency. Typically, for the capacity portions allocated in the uplink (namely, for transmitting hub to satellite communications and terminal to satellite communications) the allocated frequency is substantially different from the frequency allocated for carrying out downlink communications (i.e. satellite to hub communications and satellite to terminal communications), using the capacity portion allocated therefor.

One approach for scheduling the transmissions is to perform on-the-fly transmit-receive conflict resolution without imposing any limitation on the terminals by inducing a framing mechanism thereon. To do that, a scheduler must ensure that packets are only multiplexed onto the forward link at such times that they arrive at the terminal when it is not transmitting. This means, in turn, that the forward link multiplexer must maintain a separate queue for each (active) terminal and, in addition, track the propagation delay between the satellite and that very same terminal. Once every return link time slot, and for each non-empty output queue, the scheduler would use the delay information to consult the return link capacity allocation matrix in order to check whether, at the projected time of forward link packet reception, the terminal is scheduled to transmit or not. The scheduler must then serve fairly the non-blocked queues. In addition, scheduling must allow terminals certain pre-agreed short transmission windows for random-access return link transmissions. Finally, return link capacity allocation must keep a terminal's transmission duty cycle below 100% to ensure that it can send forward link traffic without excessive delay.

Transmit-receive scheduling also impacts terminal handover between beams and satellites. With the scheme described above, the scheduler must be involved in each handover in order to make sure that forward link data is correctly re-routed.

SUMMARY OF THE DISCLOSURE

It is an object of the present disclosure to provide a transmit-receive framing mechanism that simplifies substantially scheduling, streamline satellite and beam switchover.

It is another object of the present disclosure to provide a transmit-receive framing mechanism in which most of the complexity involved in routing and handover is shifted from the satellite to the gateway and the terminals.

It is still another object of the present disclosure to provide a novel method for enabling communications between one or more satellites and a plurality of terminals, wherein the plurality of terminals are divided into M groups of terminals.

Other objects of the invention will become apparent as the description of the invention proceeds.

In the following description it is assumed that the air interface's forward link uses one or more TDM carriers, whereas its return link uses a reservation access scheme such as Multi-Frequency Time Division Multiple Access (MF-TDMA).

A key aspect of the air-interface of the present disclosure is its ability to accommodate the inability of the terminal to receive communications while being in a mode of transmitting communications. A frame that is used for the forward link, is divided into N—for example 4—equal length sub-frames. A forward link stream carried by each sub-frame will serve 1/N—one fourth using the same example—of the terminal population in a beam. The satellite return link scheduler will assign capacity to terminals, while taking into account their sub-frame association. This scheme simplifies scheduling by the satellite and allows the terminals to be grouped for addressing over the forward link, and to save receiver power.

A forward link super-frame structure, taken together with signaling e.g. over a DVB-S2 (or any other applicable standard) PL ("Physical Layer") header, is used to alert terminals which are in stand-by mode to a forward link traffic that is queued and is about to be transmitted to them.

Beam and satellite handover may optionally but not necessarily rely on a system-wide GPS-grade time-base; terminal geo-location information; accurate satellite orbital data, communicated to the terminals through layer 2 signaling over the forward link; and the framing scheme described hereinabove. These enable the gateway and the terminal, running both identical, bit-exact coverage calculation routines, to be synchronized for traffic routing and beam/satellite selection that requires minimal signaling.

Beam or satellite switchover for terminals that are in a stand-by mode or are currently receiving data, will involve no signaling and will be done with no interruption to the traffic. Return link transmission during switchover involves exchanging modified capacity request messages. It is preferably seamless during intra-satellite switchover and nearly so between satellites.

According to an embodiment of the present disclosure there is provided a method for enabling communications between one or more satellites and a plurality of terminals wherein the plurality of terminals are divided into M groups of terminals and wherein the method comprising:

forwarding a plurality of communication frames in a forward link, wherein the plurality of frames are divided into N sub-frames, and wherein traffic being carried along the forward link by each of the N sub-frames serves one or more groups of terminals associated with a respective satellite, and assigning, by a satellite return link scheduler, a respective capacity of the return link for at least one of the one or more groups of terminals, wherein the assignment takes into account which of the sub-frames is associated with that at least one group of the terminals.

According to another embodiment, the terminals belonging to the at least one group of terminals are characterized in that they cannot receive communications while they are transmitting communications.

In accordance with another embodiment, each of the at least one group of terminals is further divided into sub-groups, and a Physical Layer Header (PL-Header) of each of the forward link communication frames specifies at least one of the sub-groups, and wherein each communication frame carries traffic addressed to the at least one sub-group specified in the respective PL-Header.

By still another embodiment, each terminal is configured to decode every PL-Header of the forward link communication frames, and wherein the method further comprises a step whereby if the PL-Header carries a an indication of a sub-group that matches the sub-group of terminals to which a respective terminal belongs, the respective terminal will decode the entire communication frame, and if the PL-Header carries an indication of a sub-group that does not match the sub-group of terminals to which a respective terminal belongs, the respective terminal will not decode the respective entire communication frame.

In accordance with yet another embodiment, in a case where the PL-Header carries an indication of a sub-group that does not match the sub-group of terminals to which a respective terminal belongs, the respective terminal is configured to power down its receiver for the duration of the entire communication frame.

According to another embodiment, the method provided further comprises a step of alerting terminals from among the plurality of terminals which are currently in a stand-by mode, that traffic that is destined to them is currently being queued and is about to be transmitted to them.

In accordance with yet another embodiment, each of the N sub-frames comprises a baseband frame, and wherein all of the base-band frames are of a fixed, pre-defined length, having different modulations and/or different codes.

In accordance with another aspect, a method is provided for enabling communications between one or more satellites and a plurality of terminals, wherein the one or more satellites are configured to communicate with the plurality of terminals belonging to a public network through at least one gateway, and wherein the plurality of terminals and the at least one gateway are configured to execute identical, bit-exact satellite coverage calculation routines, synchronized for traffic routing and beam/satellite selection with minimal signaling.

According to another embodiment of this aspect, each of the plurality of terminals is configured to generate requests for allocation of return link capacity in another beam or a different satellite, thereby when a terminal switches a beam or a satellite, it is able to immediately utilize said allocated capacity over the new (switched-to) beam or at the new satellite.

In accordance with another embodiment, the terminal is configured to:
accept initial geolocation information and to carry out a coarse alignment procedure; and
execute a calibration routine that allows fine-aligning of its orientation and tilt based on reception of communications sent by the terminal to the respective satellite.

By yet another embodiment, the one or more satellites are configured to:
use gateway-referenced mechanism to establish a system-wide Time of Day (ToD) time base; and
to periodically broadcast information that specifies the information that relates to a respective satellite of the one or more satellites.

According to still another embodiment, adaptive acquisition time is allocated for a period of time required for carrying out an inter-beam switchover and/or inter-satellite switchover.

In accordance with another embodiment, the satellite system is a member selected from a group that consists of: a Geo Stationary system, a LEO system and a MEO system.

BRIEF DESCRIPTION OF THE DRAWINGS

The present invention will be more fully understood from the following detailed description of the embodiments thereof, taken together with the drawings which.

DETAILED DESCRIPTION OF THE DISCLOSURE

General Scheme and Relevant Standards

Figure 1:
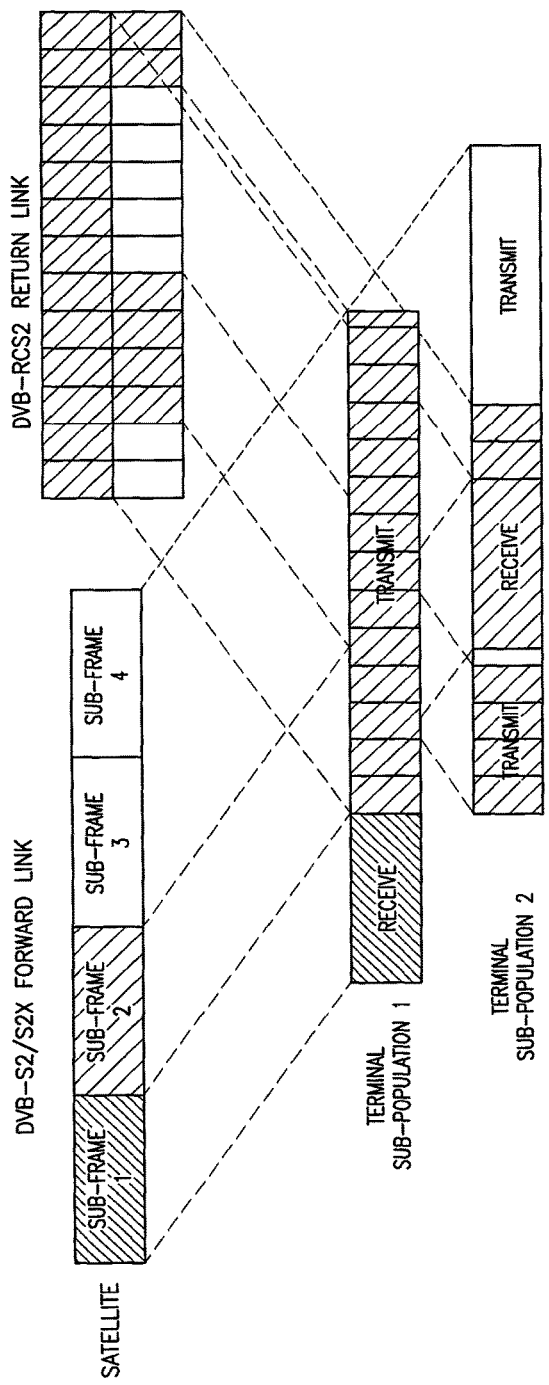
FIG. 1 illustrates an example scheme for transmit-receive scheduling.

For the forward link, a single-carrier non-spread modulation is preferably used, e.g. as in the DVB-S2 and in DVB-S2X Standards (ETSI EN 302 307-1 and EN 302 307-2), while for the return link, a Multi-Frequency Time Division Multiple Access (MF-TDMA) may be used, e.g. DVB-RCS2 standard, (EN 301 542-2).

Other transmission techniques, although possible, are not too suitable for a satellite link which is mainly a clear line-of-sight channel, with a very high SNR sensitivity. The CDMA technique generates self-interference and is therefore less power efficient. On the other hand, S-MIM (ETSI TS 102 721-1 that has been developed to address the self-interference issue), is too complex for cost-effective implementation on board the satellite. The OFDM technique, which has been adopted for use in cellular and wireless LAN networks, provides significant advantages for obstructed multipath rich channel, but it requires a large HPA back-off and is more sensitive to phase noise. In addition, the benefits of all the above techniques in multipath channels do not come into play in a Ku-band, stationary terminal scenario.

1. Forward Link

The forward link of the present invention is somewhat similar to a DVB-S2/S2X link but is characterized by having at least the following differences when compared with a DVB-S2/S2X link:

A modified Physical Layer (PL) header provided by the present invention that is characterized in that it: (a) enables combined low-SNR and high-SNR adaptive coding and modulation (ACM); and (b) includes a larger payload of mode-setting bits.

Base-band frames have a constant length in symbols (and may carry a number of bits that varies by the modulation currently used).

2. Return Link

The return link of the present invention is somewhat similar to a DVB-RCS2 link but is characterized by having at least the following difference when compared with a DVB-RCS2 link: certain MAC messages include additional, non-standard information such as the terminal's location and sub-population assignment.

Physical Layer (PHY)

1. Forward Link

The forward link PHY is somewhat similar to the definition provided in the DVB-S2/S2X standard, but is characterized by having at least the following differences when compared with a DVB-S2/S2X link:

An extended Physical Layer Header (PL-Header) includes a longer Start Of Frame ("SOF") sequence in order to ensure a first-time acquisition, and a longer Physical Layer Signaling ("PLS") field which comprises more signaling bits. The PLS is preferably used to signal at least one of the following:

Forward Link Frame and Super-frame boundaries;
Terminal grouping; and
Terminal alert messages For low-SNR operation, the baseline header described above may be extended to include a longer SOF sequence (based on the standard SOF), and additional FEC bits for the PLS field. To maintain a constant base-band frame length, low-SNR frames may use punctured LDPC codes. The forward link may be capable of supporting mixed operation of baseline (high-SNR) and low-SNR base-band frames.

2. Return Link

The return link PHY is somewhat similar to that as defined by DVB-RCS2 PHY.

Transmit-Receive Scheduling

The present invention provides a transmit-receive framing mechanism that greatly simplifies scheduling and streamline satellite and beam switchover. Moreover, it transfers most of the complexity of routing and handover from the satellite to the gateway and the terminals. This comes at the cost of modest framing delay and a somewhat lower terminal transmission duty cycle (75% for the example of 4 sub-frames, compared with a best-case of over 90%).

Frames' Scheduling

When implementing the DVB-S2/S2X standard, the term "a baseband frame" relates to a frame that contains a number of payload (user information) bits, which varies between 2432 to 53760. The destination of this information can be to one user (a terminal) or to many users (when operating in a broadcast mode, or in a time-division mode).

A base-band header is added to these payload bits and the whole frame is then encoded, modulated to symbols and framed into a Physical Layer Frame (PL-Frame), which contains between 3330 to 33282 symbols. Obviously, a terminal receiving such a PL-frame has first to decode the header of the PL-frame, in order to be able to access the data contained in that frame.

The symbols may be transmitted at different rates, depending on the allocated bandwidth at the satellite. In the following examples, we assume a rate of 500 Msps (which is supported by High-Throughput satellites), so that if one takes for example a fixed PL-frame of 32400 symbols it would take 64.8 microseconds for that PL-frame to be transmitted. Note that 500 Msps. Other transmission rates may be 36 Msps, or 72 Msps, which are currently more common. At these rates, the time required to transmit a 32400 symbols long PL-frame would be 0.9 msec or 0.45 msec, respectively.

A sub-frame of 0.5 msec comprises about 8 PL-Frames when using a 500 Msps rate. However, when dealing with longer PL-frames, the length of the frames according to the present disclosure will have to be modified, since a PL-frame cannot be divided into several sub-frames.

In the following disclosure a time period of 2 msec is exemplified as being associated with a communication frame, which is the equivalent of having 16 PL-frames. A super-frame that comprises 5 communication frames, will therefore comprise 80 PL-frames.

In other words, the term "sub-frame" refers herein throughout the specification and claims to an entity that comprises several PL-frames, each of which comprising a base-band frame.

FIG. 1 illustrates an example scheme for transmit-receive scheduling, for an example set of parameters, wherein:

Forward link base-band frames are grouped into 2 mS long frames. Each frame is divided into four equal-length (0.5 mS long) sub-frames, each consisting of an integer number of e.g. DVB-S2 or DVB-S2X base-band frames. The satellite forward link carries four equal-rate streams (e.g. DVB-S2 or DVB-S2X), each occupying one sub-frame within a frame (for example, for a single-carrier-per-beam 500 Msps carrier, there will be four 125 Msps streams).

The terminal population is divided into four equal-size sub-populations. The division is done in a way that maximizes randomness across geography (and therefore within any single beam at any given time). Each sub-population of terminals receives the stream carried by one sub-frame within a frame. This division is fixed (i.e. a static division).

Framing increases the forward link delay by the duration of three sub-frames—1.5 mS in the example discussed above. Each sub-population (served by one of the four forward link sub-frames) may be further divided into groups. Each such group is served by a fraction of the sub-frame capacity, designated by a time-slice number (as defined for example by DVB-S2, Annex M) thereby representing the group. This makes it possible for a terminal to power down its receiver for the duration of a base-band frame as soon as it has determined that the frame's group (time-slice) number is not the one associated with the very same terminal.

There is an integer number of return link TDMA slots within the time period of a forward link sub-frame. A return link transmission time is allocated for a terminal during the three sub-frames within a frame, when it is not receiving communications. Return link capacity allocation takes into account satellite-terminal delay to ensure that capacity assignments (made in the satellite's return link time frame) are compatible with the terminal's transmit time window (as illustrated for example in FIG. 1).

Decreasing the frame duration reduces delay on one hand but also reduces the effectiveness of grouping on the other hand.

Increasing (or decreasing) the number n of sub-frames within a frame increases (or decreases) the transmit time window (to 1-1/n of a frame) and increases (or decreases) the delay somewhat (to 1-1/n of a frame).

Transmit-receive scheduling and return link capacity assignment are preferably signaled in layer 2. Their implementation in the satellite and the terminal is preferably managed by software.

The assignment of the terminal's sub-population and group is preferably carried out at the gateway. Each packet sent over the gateway-to-satellite link carries this data as side-information, thereby relieving the satellite from the task of storing mappings for the entire terminals' population.

Either the satellite or the gateway, allocate return link capacity. Upon session initiation (and preferably during handover), the terminal provides the satellite with the necessary information on its current location and sub-population assignment, and this data may then be cached at the satellite for the various active terminals.

Terminal Alerting

In order to save power, terminals that are not transmitting or receiving communications, enter preferably a stand-by mode in which all but a minimal set of their sub-systems, are powered down. An inactive terminal comes out of its stand-by mode when either (a) a packet arrives at its local interface; or (b) it is addressed by the satellite over the forward link; or (c) it has to perform an infrequent housekeeping task such as receiving updated system information. Out of these three cases, case (b) involves the following features of the air interface:

Each M—for example five—forward link frames will be grouped into a Super-frame (10 mS long for 5×2 mS frames). The start of a super-frame is signaled by the PLS.

Part of the PLS payload is dedicated to terminal alerting—signaling terminals that are currently in a stand-by mode that there is queued forward link traffic addressed to them, which will be transmitted within the next sub-frame. The terminal altering channel within the PLS may use time division multiplexing over a super-frame in a way that any single terminal only needs to demodulate a small number of (and with very high probability only one) base-band frame PL headers at a known offset within a known sub-frame in the super-frame. Thus, a terminal in a stand-by mode, will power up—once every 10 mS for the above example—the receiver blocks needed for demodulating one forward link base-band frame PL header (and very infrequently, a small number of subsequent headers), before returning to its stand-by mode.

A 10 mS super-frame introduces an average/worst-case delay in start-up of forward link traffic of 5/10 mS, respectively.

Return Link Burst Synchronization

As specified by the DVB-RCS2 ETSI standard, a master oscillator at the satellite generates the time base for the Network Clock Reference ("NCR"), used by the terminals to time their return link bursts. This oscillator is locked to the forward link symbol clock, and the frequencies are chosen so that the terminal can convert the timing of the start of a sub-frame to an NCR value. This makes it possible for a terminal that comes out of stand-by mode to re-acquire the NCR as soon as it has demodulated the first base-band frame header.

Satellite Tracking and Handover

Enabling Features

In order to make satellite tracking and handover as efficient and seamless as possible, the following is preferably carried out:

a. At installation, the terminal is programmed with its geo-location, with a high degree accuracy (for example within 50 m). The terminal is also coarsely 3-axis aligned (in North-South orientation and 2-axis tilt).

b. During commissioning, the terminal executes a calibration routine that fine-align its orientation and tilt, based on the satellite reception.

c. The satellites use GPS receivers or an equivalent gateway-referenced mechanism to establish a system-wide Time of Day (ToD) time base, and the gateways are configured to align themselves to the time base. The DVB-RCS2 NCR may serve for this purpose.

d. The satellites broadcast periodically over the forward link of each beam, Layer 2 information that specifies the system's satellite constellation—orbits and satellite positions—to an accuracy that would enable a terminal to predict the location of any satellite for a period such as up to 12 hours ahead, to within an accuracy of for example 100 m (300 nS one-way propagation time).

e. All gateways and terminals execute identical, bit accurate coverage mapping routines that use the information associated with (a) and (d) and timed by (c), in order to determine satellite coverage of a terminal.

Terminal's Antenna Tracking

Given sections (a) through (d) above, the terminal's antenna is able to track satellites without relying on signal strength indication. A terminal that has been in a stand-by mode for a pre-determined period of time, say 12 hours, activates itself for a period of time needed to receive up-to-date constellation information.

Coverage mapping routine (e) also provides the terminal with the satellite's Doppler frequency shift. The terminal may then use this information to:

Anticipate the resulting carrier frequency shift when acquiring and tracking the forward channel;

Correct the local NCR time-base;

Pre-correct the carrier frequency for return link bursts, so they would arrive at the satellite receiver with no shift.

Inter-Beam (Intra-Satellite) Switchover

All forward links generated by a satellite across all its beams may be synchronized at the symbol, base-band frame, sub-frame, frame and super-frame levels. Coverage mapping routine (e), executed by the terminal, determines the frame at which the terminal must switch beams. The terminal programs its receive synthesizer during the preceding transmit sub-frame and it is then able to acquire the first receive sub-frame (or, in a stand-by mode, receive the alert signal) over the new beam, with the same accuracy as while dwelling in the former beam.

Satellite and beam routing to a terminal is preferably determined by the gateway and signaled to the satellite through side-information attached to every forward link packet. The gateway, running the same coverage mapping routine (e) as the terminal, determines the timing of terminal beam switching and route forward link traffic accordingly. In order to minimize forward link queuing delay during a beam switch, either (a) the gateway is made aware of sub-framing when managing forward link queuing, or (b) the satellite is provided with data "expiration" information and prioritize traffic to terminals that are about to switch away from one of its beams.

With the exception of short and infrequent session initiating messages, return link transmissions from a terminal can only be made after a capacity request was sent to the satellite and a capacity assignment was made and received in response to the request made. The satellite responds to capacity request messages with a tightly controlled response time: the terminal receives the assignment a pre-defined number of sub-frames after it had made the request and—unless the return channel is heavily overloaded—the assignment will be for a (small) fixed number of sub-frames in the future.

In order to minimize interruption to traffic to and from terminals during a beam switch, forward- and return-link switching use the procedure illustrated in the following FIG. 2.

Figure 2:
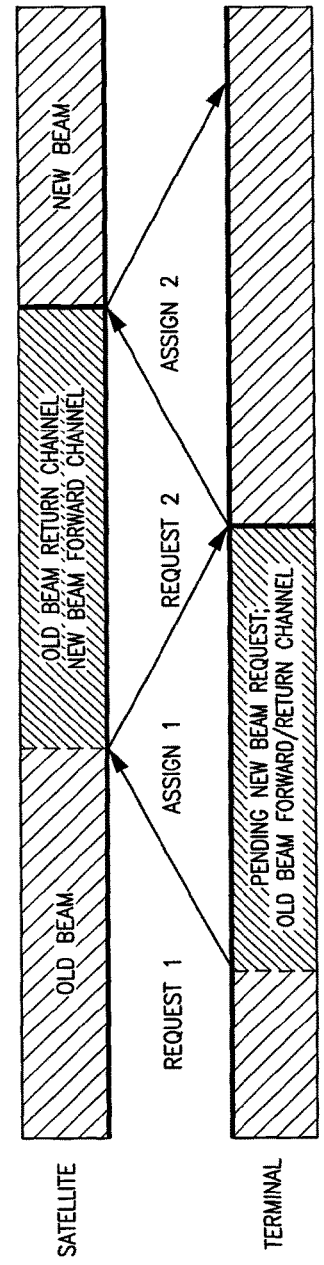
FIG. 2 the satellite accepts requests for capacity in the new beam that are received over the old beam.

As may be seen in FIG. 2 the satellite accepts requests for capacity allocation for the new beam that are received over the old beam. When anticipating a beam switchover, the terminal makes—over the old beam—a request for capacity allocation in the new beam, at such time that the assignment is received just prior the switchover (Request 1 in FIG. 2). There will only be at most one other such request pending from a given terminal. While the request is pending, the terminal continues to receive forward link and transmit (as was previously assigned) return link traffic over the old beam.

The gateway re-routes traffic to the new beam at the time it should start arriving at the terminal, immediately following the switchover. There will be a transition phase (approximately coinciding with the time the cross-beam capacity request is pending) when the satellite receives the terminal's traffic over the old beam and transmits traffic to the very same terminal over the new beam.

At the switchover, the terminal re-programs its transmit and receive LO frequency synthesizers during the receive and transmit sub-frames, respectively.

Preferably, inter-beam (intra-satellite) beam switching does not in itself involve any air interface messaging.

Beam selection and switching decisions are made by the gateway and the terminal: the satellite does not have to track the switchover process.

Inter-Satellite Switchover

As explained hereinabove, all the satellites in the system are preferably synchronized to a common ToD. Their forward links are synchronized at the base-band frame, sub-frame, frame and super-frame levels, and their return links have synchronized slots.

The coverage mapping routine executed at the terminal determines the timing of the satellite switchover. A terminal in a stand-by mode uses this information to switch to the new satellite and then proceeds to demodulate its terminal alert channel.

Forward link traffic to an active terminal that is switching satellites is re-routed by the gateway to the new satellite. The gateway executes the same coverage-mapping algorithm as the terminal and will time the re-routing in advance so that, after propagating through the system, the forward link traffic arrives at the terminal aligned in time with the switchover without experiencing any switchover-related queuing delay.

In order to perform a return link switchover, the terminal sends, ahead of the switchover moment, a special capacity request message that is forwarded by the old (switched-from) satellite to the new (switched-to) satellite. This message is either carried over an Inter-Satellite Link ("ISL"), if one extends between the two satellites, or goes through the gateway(s) serving them. The capacity request specifies the time of switchover, allowing the new satellite to allocate the required capacity accordingly. The terminal will time this request message to allow enough time for an assignment response to arrive back through the old satellite before implementing a switchover. The terminal is then able to switch the return link transmission from the old to the new satellite with only a small hit in throughput.

The terminal re-programs its transmit and receive LO frequency synthesizers during the receive and transmit sub-frames respectively, immediately preceding the switchover, and steers its antenna from the old satellite to the new satellite during the back-end part of the transmit sub-frame immediately preceding switchover. This reduces by a small amount the return link transmit time window within the last frame before the switchover takes place. In addition, any difference in terminal-satellite path delay between the old and the new satellite will cause a shift in the frame, changing the duration of the first transmit window following the switchover.

The coverage-mapping routine preferably provides the carrier-frequency Doppler shift of the new satellite.

There will be, immediately after switchover, a larger uncertainty in timing of the received forward channel than during beam dwell. A larger search window will therefore be needed for the first sub-frame or (for a terminal being in a stand-by mode) alert channel access. At the same time, assuming the enabling features discussed above, this window will be much shorter than one forward link base-band frame, creating no ambiguity in the PL header to be demodulated.

First-time return link transmissions arrive at the new satellite with a larger timing error than the follow-on traffic (500 nS, for the example parameters given above, or 1% of 50 µS for a relatively short 1024 bit burst at 20 Mbps). To optimize the return link guard interval, so that it is not affected by the constraints of this tiny fraction of traffic, return link capacity assigned through the procedure described above will leave entire slots as guard time intervals and, if needed, the satellite's return link receiver(s) will be alerted to perform burst acquisition over a larger search window.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for enabling communications between one or more satellites and a plurality of terminals, said method comprising:

forwarding a plurality of communication frames in a forward link to a plurality of terminals, wherein the plurality of terminals are divided into M groups of terminals; wherein said plurality of communication frames are divided into N sub-frames, and wherein traffic being carried along the forward link by each of the N sub-frames serves one or more groups of terminals associated with a respective satellite, such that each group is served by at least a fraction of a sub-frame capacity of the plurality of communication frames, associated with a forward link time slot; and assigning, by a satellite return link scheduler, a respective capacity of the return link for at least one group of terminals of the one or more groups of terminals, wherein the terminals belonging to the at least one group of terminals are configured such that the terminals cannot receive communications while they are transmitting communications; and wherein the assignment of the respective capacity of the return link to the at least one group is allocated in return link time slots at which the terminals of the at least one group of terminals are not receiving communication of the sub-frames of said forward link which are is associated with said at least one group of the terminals.

2. The method of claim 1, wherein each of the at least one group of terminals is further divided into sub-groups, and a Physical Layer Header (PL-Header) of each of the forward link communication frames specifies at least one of the sub-groups, and wherein each communication frame carries traffic addressed to the at least one sub-group specified in the respective PL-Header.

3. The method of claim 1, wherein each terminal is configured to decode every PL-Header of the forward link communication frames, and wherein the method further comprises a step whereby if the PL-Header carries a an indication of a sub-group that matches the sub-group of terminals to which a respective terminal belongs, said respective terminal will decode the entire communication frame, and if the PL-Header carries an indication of a sub-group that does not match the sub-group of terminals to which a respective terminal belongs, said respective terminal will not decode the respective entire communication frame.

4. The method of claim 3, wherein in a case where the PL-Header carries an indication of a sub-group that does not match the sub-group of terminals to which a respective terminal belongs, said respective terminal is configured to power down its receiver for the duration of the entire communication frame.

5. The method of claim 1, further comprising a step of alerting terminals from among the plurality of terminals which are currently in a stand-by mode, that traffic that is destined to them is currently being queued and is about to be transmitted to them.

6. The method of claim 1, wherein the one or more satellites are configured to communicate with the plurality of terminals belonging to a public network through at least one gateway, and wherein the plurality of terminals and the at least one gateway are configured to execute identical, bit-exact satellite coverage calculation routines, synchronized for traffic routing and beam/satellite selection with minimal signaling.

7. The method of claim 6, wherein each of the plurality of terminals is configured to generate requests for allocation of return link capacity in another beam or a different satellite, thereby when a terminal switches a beam or a satellite, it is able to immediately utilize said allocated capacity over the new (switched-to) beam or at the new satellite.

8. The method of claim 6, wherein the terminal is configured to:
accept initial geolocation information and to carry out a coarse alignment procedure; and
execute a calibration routine that allows fine-aligning of its orientation and tilt based on reception of communications sent by the terminal to the respective satellite.

9. The method of claim 8, wherein the one or more satellites are configured to:
use gateway-referenced mechanism to establish a system-wide Time of Day (ToD) time base; and
to periodically broadcast information that specifies the information that relates to a respective satellite of the one or more satellites.

10. The method of claim 6, wherein adaptive acquisition time is allocated for a period of time required for carrying out an inter-beam switchover and/or inter-satellite switchover.

11. The method of claim 6, wherein the satellite system is a member selected from a group that consists of: a Geo Stationary system, a LEO system and a MEO system.

12. The method of claim 1, wherein each of the N sub-frames comprises a baseband frame, and wherein all the baseband frames are of fixed length at different modulations and codes.

13. A method for enabling communications between one or more satellites and a plurality of terminals wherein the plurality of terminals are divided into M groups of terminals and wherein said method comprising:
forwarding a plurality of communication frames in a forward link, wherein said plurality of frames are divided into N sub-frames, and wherein traffic being carried along the forward link by each of the N sub-frames serves one or more groups of terminals associated with a respective satellite; and
assigning, by a satellite return link scheduler, a respective capacity of the return link for at least one of the one or more groups of terminals, wherein said assignment takes into account which of the sub-frames is associated with that at least one group of the terminals,
wherein the one or more satellites are configured to communicate with the plurality of terminals belonging to a public network through at least one gateway, and wherein the plurality of terminals and the at least one gateway are configured to execute identical, bit-exact satellite coverage calculation routines, synchronized for traffic routing and beam/satellite selection with minimal signaling.

14. The method of claim 13, wherein each of the plurality of terminals is configured to generate requests for allocation of return link capacity in another beam or a different satellite, thereby when a terminal switches a beam or a satellite, it is able to immediately utilize said allocated capacity over the new (switched-to) beam or at the new satellite.

15. The method of claim 13, wherein the terminal is configured to:
accept initial geolocation information and to carry out a coarse alignment procedure; and
execute a calibration routine that allows fine-aligning of its orientation and tilt based on reception of communications sent by the terminal to the respective satellite.

16. The method of claim 15, wherein the one or more satellites are configured to:
use gateway-referenced mechanism to establish a system-wide Time of Day (ToD) time base; and
to periodically broadcast information that specifies the information that relates to a respective satellite of the one or more satellites.

17. The method of claim 13, wherein adaptive acquisition time is allocated for a period of time required for carrying out an inter-beam switchover and/or inter-satellite switchover.

18. The method of claim 13, wherein the satellite system is a member selected from a group that consists of: a Geo Stationary system, a LEO system and a MEO system.

\* \* \* \* \*